US012758905B2

(12) United States Patent
Lin et al.

(10) Patent No.: US 12,758,905 B2
(45) Date of Patent: Oct. 13, 2026

(54) MANUFACTURING METHOD OF MELTBLOWN FIBER MEMBRANE

(71) Applicant: TAIWAN TEXTILE RESEARCH INSTITUTE, New Taipei City (TW)

(72) Inventors: Ying-Chi Lin, New Taipei City (TW); Wei-Hung Chen, New Taipei City (TW)

(73) Assignee: TAIWAN TEXTILE RESEARCH INSTITUTE, New Taipei City (TW)

(*) Notice: Subject to any disclaimer, the term of this patent is extended or adjusted under 35 U.S.C. 154(b) by 393 days.

(21) Appl. No.: 18/522,363

(22) Filed: Nov. 29, 2023

(65) Prior Publication Data

US 2024/0181376 A1 Jun. 6, 2024

(30) Foreign Application Priority Data

Nov. 30, 2022 (TW) ................................. 111146055

(51) Int. Cl.

| | |
|---|---|
| ***B01D 39/16*** | (2006.01) |
| ***B01D 67/00*** | (2006.01) |
| ***B01D 69/02*** | (2006.01) |
| ***B01D 71/48*** | (2006.01) |

(52) U.S. Cl.

CPC ..... *B01D 39/1623* (2013.01); *B01D 67/0002* (2013.01); *B01D 69/02* (2013.01); *B01D 71/48* (2013.01); *B01D 2239/0622* (2013.01); *B01D 2239/1233* (2013.01); *B01D 2323/081* (2022.08); *B01D 2323/10* (2013.01)

(58) Field of Classification Search

CPC ................ B01D 39/1623; B01D 39/16; B01D 67/0002; B01D 67/00; B01D 69/02; B01D 71/48; B01D 2323/081; B01D 2323/10; B01D 2239/0622; B01D 2239/1233; B29C 47/12; B29C 47/00; B32B 5/26; D01D 5/0985; D01D 5/098; D01F 6/62; D04H 1/43838; D04H 1/56; D04H 1/435; D04H 1/55; D04H 1/4382; D04H 3/011; D04H 3/02; D04H 3/16; D04H 13/00; D06C 15/02

USPC ........................................................ 210/505

See application file for complete search history.

(56) References Cited

U.S. PATENT DOCUMENTS

| | | | | |
|---|---|---|---|---|
| 7,980,838 B2 | 7/2011 | Park | | |
| 2002/0034909 A1* | 3/2002 | Bansal | ................ | D01D 5/0985 442/361 |

(Continued)

*Primary Examiner* — Akash K Varma

(74) *Attorney, Agent, or Firm* — McClure, Qualey & Rodack, LLP

(57) ABSTRACT

A manufacturing method of a meltblown fiber membrane includes the following step. A meltblown film is made to pass between a first pressing roller and a second pressing roller, such that a calendering process is performed on the meltblown film, in which the meltblown film includes a plurality of meltblown fibers, each of the meltblown fibers includes a high-fluidity polyester and a modified polyester, a melt index of the high-fluidity polyester under a temperature of 230° C. ranges from 350 g/10 min to 550 g/10 min, a melt index of the modified polyester under a temperature of 230° C. ranges from 200 g/10 min to 400 g/10 min, and a roller temperature of each of the first pressing roller and the second pressing roller ranges from 100° C. to 155° C.

10 Claims, 1 Drawing Sheet

(56) References Cited

U.S. PATENT DOCUMENTS

| | | | | |
|---|---|---|---|---|
| 2008/0241297 | A1* | 10/2008 | Park | B82Y 30/00 425/131.5 |
| 2009/0186548 | A1* | 7/2009 | Rock | A41D 31/145 156/244.11 |
| 2020/0398200 | A1* | 12/2020 | Demmel | B01D 39/1623 |
| 2021/0171707 | A1* | 6/2021 | Xue | D04H 1/435 |

* cited by examiner

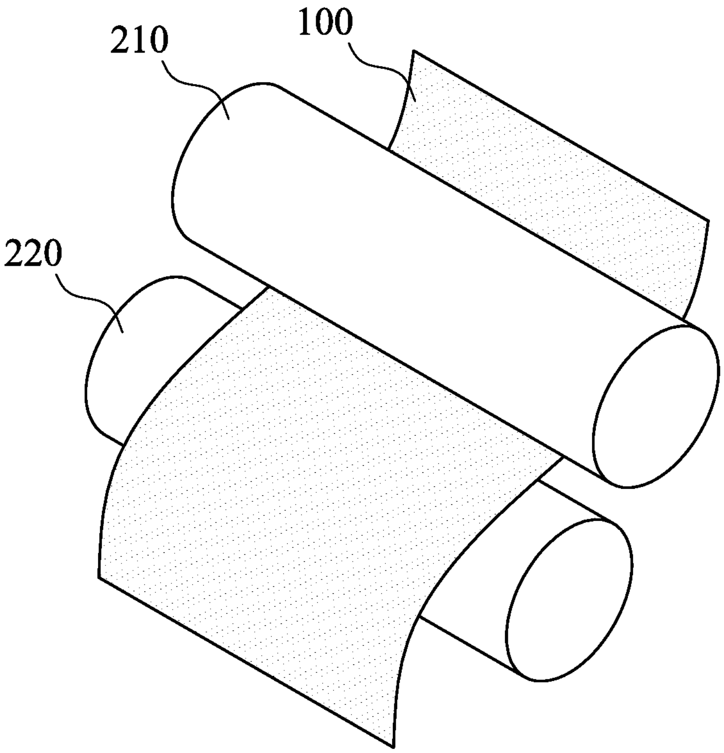
100
210
220

MANUFACTURING METHOD OF MELTBLOWN FIBER MEMBRANE

CROSS-REFERENCE TO RELATED APPLICATION

This application claims priority to Taiwan Application Serial Number 111146055, filed Nov. 30, 2022, which is herein incorporated by reference.

BACKGROUND

Field of Disclosure

The present disclosure relates to a manufacturing method of a fiber film, and particularly relates to a manufacturing method of a meltblown fiber membrane.

Description of Related Art

In the textile industry, since non-woven fabrics can be formed without weaving, issues related to non-woven fabrics have gradually become the focus of development. In addition, since non-woven fabrics have the advantages of short process time, high output, low cost, and wide sources of its raw materials, they are suitable for applied in the consumer market. A broad definition of non-woven fabrics can be a cloth formed by pressure or stickiness. However, the manufacturing process of the non-woven fabrics can be quite diverse, and as the manufacturing method changes, the characteristics of the non-woven fabrics change accordingly.

Generally, compared with the melt-blowing process, the non-woven fabric formed by the electrospinning process usually has finer fibers, and can also be referred to as "fiber film." However, the production speed of the electrospinning process is slower than that of the melt-blowing process due to the limitation of the electrospinning equipment. Therefore, how to prepare a fiber film with low fiber fineness and high fiber distribution uniformity through the melt-blowing process and make the fiber film have appropriate and concentrated pore sizes (i.e., appropriate pore sizes with a high central tendency) such that the fiber film has high air permeability and high moisture permeability is so far an important issue.

SUMMARY

The present disclosure provides a manufacturing method of a meltblown fiber membrane, which can prepare a meltblown fiber membrane with high moisture permeability and high air permeability.

According to some embodiments of the present disclosure, a manufacturing method of a meltblown film includes the following step: passing a meltblown film between a first pressing roller and a second pressing roller to perform a calendering process on the meltblown film, in which the meltblown film includes a plurality of meltblown fibers, each of the meltblown fibers includes a high-fluidity polyester and a modified polyester, a melt index of the high-fluidity polyester under a temperature of 230° C. ranges from 350 g/10 min to 550 g/10 min, a melt index of the modified polyester under a temperature of 230° C. ranges from 200 g/10 min to 400 g/10 min, and a roller temperature of each of the first pressing roller and the second pressing roller ranges from 100° C. to 155° C.

In some embodiments of the present disclosure, a roller distance between the first pressing roller and the second pressing roller ranges from 0.05 mm to 0.10 mm.

In some embodiments of the present disclosure, the high-fluidity polyester is polybutylene terephthalate, and a roller temperature of each of the first pressing roller and the second pressing roller ranges from 130° C. and 155° C.

In some embodiments of the present disclosure, the high-fluidity polyester is a thermoplastic polyester elastomer, and a roller temperature of each of the first pressing roller and the second pressing roller ranges from 100° C. and 115° C.

In some embodiments of the present disclosure, a linear pressure (line pressure) of each of the first pressing roller and the second pressing roller ranges from 50 kg/cm to 70 kg/cm.

In some embodiments of the present disclosure, more than 50% of a quantity of the meltblown fibers has a fiber diameter ranging from 0.5 μm to 1.5 μm.

In some embodiments of the present disclosure, more than 75% of a quantity of the meltblown fibers has a fiber diameter ranging from 0.5 μm to 1.0 μm.

In some embodiments of the present disclosure, the modified polyester comprises a soft-chain polyester, and the soft-chain polyester has a monomer represented by formula (1):

formula (1)

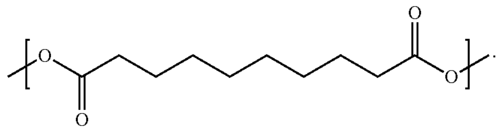

In some embodiments of the present disclosure, the modified polyester comprises a soft-chain polyester, and the soft-chain polyester has a monomer represented by formula (2):

formula (2)

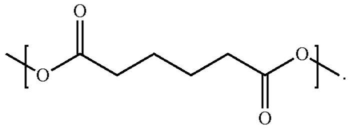

In some embodiments of the present disclosure, the modified polyester comprises a soft-chain polyester, and the soft-chain polyester has a monomer represented by formula (3):

formula (3)

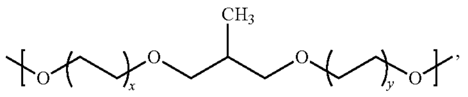

in which x is a positive integer ranging from 1 to 12, and y is a positive integer ranging from 1 to 12.

According to the aforementioned embodiments of the present disclosure, since the meltblown fibers in the meltblown film used in the present disclosure include the high-fluidity polyester and the modified polyester, and each of the high-fluidity polyester and the modified polyester has a specific range of melt index, the meltblown fiber can have low and concentrated fiber fineness (i.e., low fiber fineness with a high central tendency), thereby being evenly distributed in the meltblown fiber membrane. In addition, since the calendering process of the meltblown film is carried out with pressing rollers with a specific range of roller temperature, the meltblown fiber membrane can have appropriate and concentrated pore sizes (i.e., pore sizes with a high central tendency). Therefore, the meltblown fiber membrane is provided with high moisture permeability and high air permeability.

BRIEF DESCRIPTION OF THE DRAWINGS

The disclosure can be more fully understood by reading the following detailed description of the embodiments, with reference made to the accompanying drawings as follows:

The single FIGURE is a schematic perspective view illustrating a manufacturing method of a meltblown fiber membrane during a calendering process according to some embodiments of the present disclosure.

DETAILED DESCRIPTION

Reference will now be made in detail to the present embodiments of the disclosure, examples of which are illustrated in the accompanying drawings. However, it should be understood that these details should not be intend to limit the present disclosure. In addition, for the convenience of readers, the size of each element in the drawings is not illustrated according to actual scale.

In the present disclosure, the structure of a polymer or a functional group is sometimes represented by a skeleton formula. This representation can omit carbon atoms, hydrogen atoms, and carbon-hydrogen bonds. Certainly, if the atom or atom group is clearly drawn in the structural formula, the drawing shall prevail.

It should be understood that although the terms "first," "second," and "third" may be used herein to describe various elements, components, regions, layers, and/or portions, these elements, components, regions, layers, and/or portions should not be restricted by these terms. These terms are only used to distinguish one element, component, region, layer, or portion from another element, component, region, layer, or portion. Therefore, the "first element," "first component," "first region," "first layer," or "first portion" described below can also be referred to as a second element, second component, second region, second layer, or second portion without departing from the teachings herein.

The present disclosure provides a manufacturing method of a meltblown fiber membrane, which includes performing a calendering process on a meltblown film which includes a plurality of meltblown fibers. By adjusting the properties of each material in the meltblown fiber, the meltblown fiber can have low and concentrated fiber fineness (i.e., low fiber fineness with a high central tendency), thereby being evenly distributed in the meltblown fiber membrane. By adjusting the roller temperature during the calendering process, the meltblown fiber membrane can have appropriate and concentrated pore sizes (i.e., pore sizes with a high central tendency). Therefore, the meltblown fiber membrane can provided with high moisture permeability and high air permeability.

The manufacturing method of the meltblown fiber membrane of the present disclosure includes step S10 to step S20. In step S10, a meltblown film including a plurality of meltblown fibers is formed. In step S20, a calendering process is performed on the meltblown film to form a meltblown fiber membrane. In the following description, the aforementioned steps will be described in more detail.

Firstly, in step S10, a meltblown film including a plurality of meltblown fibers is formed. The meltblown fiber of the present disclosure includes a high-fluidity polyester and a modified polyester. In some embodiments, a content of the high-fluidity polyester may range from 90 parts by weight to 95 parts by weight, and a content of the modified polyester may range from 5 parts by weight to 10 parts by weight. The high-fluidity polyester and the modified polyester falling within the aforementioned content ratio can make the polyester mixture, which is obtained by mixing the high-fluidity polyester and the modified polyester, have good fluidity and molecular flexibility during the melt-blowing process, which is conducive to reducing the fiber fineness of the formed meltblown fibers, and can make the fiber fineness of the meltblown fibers tend to be concentrated. On the other hand, each of the high-fluidity polyester and the modified polyester has an appropriate melt index, thereby having good fluidity during the melt-blowing process to reduce the fiber fineness of the meltblown fibers. Specifically, a temperature of the melt-blowing process can range from about 250° C. to 300° C., in which the high-fluidity polyester of the present disclosure has a melt index (MI) ranging from 350 g/10 min to 550 g/10 min under a temperature of 230° C., and the modified polyester of the present disclosure has a melt index ranging from 200 g/10 min and 400 g/10 min under a temperature of 230° C.

In some embodiments, the high-fluidity polyester may be polybutylene terephthalate (PBT). In some other embodiments, the high-fluidity polyester may be a thermoplastic polyester elastomer. In some embodiments, a weight-average molecular weight of the high-fluidity polyester can range from 20,000 g/mole to 60,000 g/mole, so as to ensure that the melt index of the high-fluidity polyester is maintained in the aforementioned range, thereby facilitating the formation of meltblown fibers with low fiber fineness.

In some embodiments, the modified polyester can include a low melting-point polyester, which can improve the fluidity of the polyester mixture (the polyester mixture includes the high fluidity polyester and the modified polyester) during the melt-blowing process. In some embodiments, the modified polyester can include a soft-chain polyester, which can enhance the molecular flexibility of the polyester mixture during the melt-blowing process. Overall, the modified polyester can improve the fluidity and molecular flexibility of the polyester mixture during the melt-blowing process, thereby improving the spinning ductility of the polyester mixture, so as to facilitate the formation of meltblown fibers with low fiber fineness.

For the low melting-point polyester, the melting point of the low melting-point polyester can be adjusted according to actual needs, such that the polyester mixture has suitable fluidity. In some embodiments, the low melting-point polyester can be a first low melting-point polyester, a second low melting-point polyester, or a combination thereof, in which the melting point of the first low-melting point polyester can range from 150° C. to 155° C., and the melting point of the second low melting-point polyester can range from 160° C. and 165° C. In some embodiments, a weight-average molecular weight of the low melting-point polyester may range from 8000 g/mole to 11000 g/mole, so as to ensure that the melting point of the low melting-point polyester is maintained within the aforementioned range.

For the soft-chain polyester, the chain flexibility of the soft-chain polyester may be adjusted according to actual needs, such that the polyester mixture has suitable molecular flexibility. For example, the chain length and the number of side chains of the soft-chain polyester can be adjusted such that the soft-chain polyester has suitable chain flexibility. In some embodiments, the soft-chain polyester may be, for example, a derivative formed by modifying polybutylene terephthalate (PBT). In some embodiments, the soft-chain polyester may be a first soft-chain polyester, a second soft-chain polyester, a third soft-chain polyester, or combinations thereof. In some embodiments, the first soft-chain polyester has a monomer (unit, structure) represented by formula (1):

formula (1)

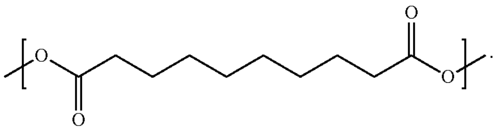

In some embodiments, the second soft-chain polyester has a monomer (unit, structure) represented by formula (2):

formula (2)

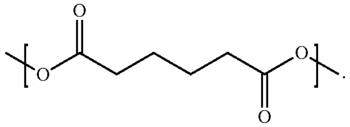

In some embodiments, the third soft-chain polyester has a monomer (unit, structure) represented by formula (3):

formula (3)

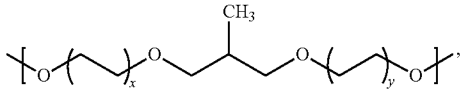

in which x is a positive integer ranging from 1 to 12, and y is a positive integer ranging from 1 to 12. Since the structures represented by the formula (1) and formula (2) have straight-chain alkane segments, they can provide good molecular flexibility to the soft-chain polyester. Since there is an ether group in the structure represented by formula (3), it can further improve the flexibility of the soft-chain polyester, thereby helping to improve the spinning ductility of the polyester mixture. In some embodiments, a weight average molecular weight of the soft-chain polyester can range from 8000 g/mole to 11000 g/mole, so as to ensure that the soft-chain polyester has a chain long enough to provide good molecular flexibility.

In some embodiments, when the temperature ranges from 260° C. to 280° C., an intrinsic viscosity of the modified polyester can range from 0.9 dL/g to 1.3 dL/g, such that the polyester mixture has high fluidity during the melt-blowing process, which is conducive to the formation of meltblown fibers with low fiber fineness. In detail, if the intrinsic viscosity of the modified polyester is greater than 1.3 dL/g, the fluidity of the modified polyester may be too low to provide good spinning ductility of the polyester mixture during the melt blown process, thereby failing to effectively reduce the fiber fineness of meltblown fibers; if the intrinsic viscosity of the modified polyester is less than 0.9 dL/g, the fluidity of the modified polyester may be too high, which is not conducive to controlling the formation of the meltblown fibers. In some embodiments, based on the good fluidity of the polyester mixture, a diameter of the spinning hole of the meltblown equipment can be configured to be about 0.15 mm to 0.30 mm, and a ratio of the length of the spinning hole to the diameter of the spinning hole can be configured to be about 20, thereby helping to form meltblown fibers with low fiber fineness.

Next, in step S20, a meltblown film is subjected to a calendering process, such that the meltblown film is formed into a meltblown fiber membrane. In detail, please refer to the single FIGURE, which is a schematic perspective view illustrating a manufacturing method of a meltblown fiber membrane during a calendering process according to some embodiments of the present disclosure. Specifically, in the present disclosure, the meltblown film 100 passes between the first pressing roller 210 and the second pressing roller 220 to be subjected to the calendering process. By adjusting each of the roller temperatures of the first pressing roller 210 and the second pressing roller 220, the average D90 pore diameter (i.e., the average value of the distribution range of 90% of the quantity of the pore diameters) of the meltblown film 100 can be controlled. Therefore, the meltblown fiber membrane not only has suitable pore sizes, but also has pore sizes with high uniformity, such that the meltblown fiber membrane has high moisture permeability and high air permeability. In detail, each of the roller temperatures of the first pressing roller 210 and the second pressing roller 220 ranges from 100° C. to 155° C. If the roller temperatures of the first pressing roller 210 and the second pressing roller 220 are less than 100° C., the temperature of the calendering process may not reach the melting point of the meltblown fibers in the meltblown film 100, failing to achieve the effect of tightly pressing the meltblown fibers, and causing the average D90 pore diameter of the meltblown fiber membrane to be too large, which cannot provide good structural strength, and is not conducive to the formation of a fabric structure with high water resistance in subsequent applications; if the roller temperatures of the first pressing roller 210 and the second pressing roller 220 are greater than 155° C., the meltblown fibers in the meltblown film 100 may be over-melted, causing the average D90 pore diameter of the meltblown fiber membrane to be too small, failing to provide high moisture permeability and high air permeability. In addition, the roller temperature design of the first pressing roller 210 and the second pressing roller 220 can also solve the problem of delamination of the fiber film.

In some embodiments, when the high-fluidity polyester in the meltblown fiber is polybutylene terephthalate, the respective roller temperatures of the first pressing roller 210 and the second pressing roller 220 can range from 130° C. to 155° C. In some other embodiments, when the high-fluidity polyester in the meltblown fiber is a thermoplastic polyester elastomer, the respective roller temperatures of the first pressing roller 210 and the second pressing roller 220 can range from 100° C. to 115° C. In other words, by adjusting the respective roller temperatures of the first pressing roller 210 and the second pressing roller 220 according to the high-fluidity polyester of different materials, the meltblown fiber membranes of different materials can have a suitable average D90 pore diameter, such that the meltblown fiber membrane is provided with high moisture permeability and high air permeability. Overall, by adjusting the respective roller temperatures of the first pressing roller 210 and the second pressing roller 220, the average D90 pore diameter of the meltblown fiber membrane can fall in a range from 2.5 μm to 3.5 μm (e.g., 2.6 μm or 3.4 μm).

In some embodiments, the D90 pore diameter distribution range (i.e., the distribution range of 90% of the quantity of the pore diameters) of the meltblown fiber membrane can be further controlled by adjusting other operating parameters of the calendering process, such that the meltblown fiber membrane has pore sizes with high uniformity, thereby providing better moisture permeability and air permeability. In some embodiments, a roller distance between the first pressing roller 210 and the second pressing roller 220 can range from 0.05 mm to 0.10 mm, and a linear pressure (line pressure) of the first pressing roller 210 and the second pressing roller I 220 can range from 50 kg/cm and 70 kg/cm. Overall, by adjusting the aforementioned operating parameters of the calendering process, the D90 pore diameter distribution range of the meltblown fiber membrane can fall within the range of 2 μm to 4 μm.

In the following description, multiple experiments were carried out on the meltblown fiber membranes of some comparative examples and some embodiments to specifically verify the efficacy of the present disclosure. It should be understood that the materials used, their amounts and proportions, processing details, and processing procedures may be appropriately changed without departing from the scope of the present disclosure. Therefore, the present disclosure should not be limited by the embodiments provided below.

Experiment 1: Fiber Diameter Test of Meltblown Fibers in Meltblown Fiber Membrane In this experiment, the fiber diameters were measured for the meltblown fibers in the meltblown fiber membranes of multiple comparative examples and multiple embodiments. The relevant descriptions and measurement results of the meltblown fiber membranes of each comparative example and embodiment are shown in Table 1. The manufacturing method of the meltblown fiber membrane of each embodiment is as described above in the previous paragraphs, and in each comparative example and each embodiment, the respective roller temperatures of the first pressing roller and the second pressing roller were 150° ° C.

TABLE 1

| | Ingredients and the Proportion of each Ingredients in the Meltblown Fiber (Part by weight) | | Average Fiber | Proportion of the Number of Fibers with a Fiber Diameter of | Proportion of the Number of Fibers with a Fiber Diameter of |
|---|---|---|---|---|---|
| | High-fluidity Polyester | Modified Polyester | Diameter (μm) | 0.5 μm to 1.0 μm (%) | 0.5 μm to 1.5 μm (%) |
| Comparative Example 1 | Regular PET (100) | | 2.35 | 1-2 | 18 |
| Comparative Example 2 | PBT (100) | N/A | 2.09 | 4 | 36 |
| Embodiment 1 | PBT (95) | PEAT (5) | 1.54 | 14 | 54 |
| Embodiment 2 | PBT (90) | LTm2 (10) | 1.69 | 16 | 51 |
| Embodiment 3 | PBT (95) | LTm2 (5) | 1.55 | 16 | 60 |
| Embodiment 4 | PBT (90) | PBST (10) | 1.54 | 20 | 56 |
| Embodiment 5 | PBT (90) | PEAT (10) | 1.66 | 23 | 56 |
| Embodiment 6 | PBT (90) | PBST + LTm2 (5 + 5) | 1.66 | 28 | 52 |
| Embodiment 7 | PBT (95) | LTm1 (5) | 1.44 | 30 | 64 |
| Embodiment 8 | PBT (90) | PBAT + LTm2 (5 + 5) | 1.62 | 31 | 55 |
| Embodiment 9 | PBT (90) | PBST + LTm1 (5 + 5) | 1.50 | 41 | 63 |
| Embodiment 10 | PBT (90) | PBST + LTm1 (3 + 7) | 1.24 | 42 | 79 |
| Embodiment 11 | PBT (90) | PEAT + LTm1 (3 + 7) | 1.31 | 44 | 68 |
| Embodiment 12 | PBT (90) | LTm1 (10) | 1.33 | 48 | 67 |
| Embodiment 13 | PBT (90) | PEAT + LTm1 (5 + 5) | 1.34 | 53 | 73 |
| Embodiment 14 | PBT (90) | PBAT + LTm1 (5 + 5) | 0.89 | 69 | 94 |
| Embodiment 15 | PBT (90) | PBAT + LTm1 (3 + 7) | 0.91 | 76 | 90 |

Note 1:
When the temperature is 230° C., the MI value of regular polyester is 100 g/10 min, the MI value of high-fluidity polyester PBT is 350 g/10 min to 550 g/10 min, and the MI value of modified polyester is 200 g/10 min to 400 g/10 min.
Note 2:
LTm1 represents the first low melting-point polyester, and LTm2 represents the second low melting-point polyester.
Note 3:
PBST represents the first soft-chain polyester, PBAT represents the second soft-chain polyester, and PEAT represents the third soft-chain polyester.

As can be seen from the measurement results of Table 1, the average fiber diameter of the meltblown fiber in the meltblown fiber membrane of each embodiment is obviously less than the average fiber diameter of the meltblown fiber in the meltblown fiber membrane of each comparative example. From the measurement results of all embodiments, it can be seen that more than 50% of the quantity of the meltblown fibers has a fiber diameter ranging from 0.5 μm to 1.5 μm, and more than 14% of the quantity of the meltblown fibers has a fiber diameter ranging from 0.5 μm to 1.0 μm, indicating that the meltblown fibers of the various embodiments can have low and concentrated fiber fineness. From Embodiments 13 to 15, it can be seen that when a specific proportion of the second or third soft-chain polyester and the first low melting-point polyester are used with the high fluidity polyester, more than 73% of the quantity of the meltblown fibers has a fiber diameter ranging from 0.5 μm to 1.5 μm, and more than 53% of the quantity of the meltblown fibers has a fiber diameter ranging from 0.5 μm to 1.0 μm, in which it can be seen from Embodiment 15 that more than 75% of the quantity of the meltblown fibers has a fiber diameter ranging from 0.5 μm to 1.0 μm, indicating that the meltblown fibers of the Embodiments 13 to 15 can have extremely low and extremely concentrated fiber fineness.

Experiment 2: Average D90 Pore Diameter Test, Air Permeability Test, Moisture Permeability Test, and Thickness Test of Meltblown Fiber Membrane In this experiment, the Comparative Example 2 and the meltblown fiber membrane of Embodiments 14 and 15 in Table 1 were measured for their average D90 pore diameter, air permeability, moisture permeability, and thickness. In Embodiments 14 and 15, the difference from Table 1 was that the respective roller temperatures of the first pressing roller and the second pressing roller are modified to be 145° C. and 155° C., respectively. It should be understood that the average D90 pore diameter was measured by a pore size analyzer purchased from Porous Materials Inc. (PMI), the air permeability is measured by the standard method ASTM D737, and the moisture permeability is measured by the standard method CNS 12222 L3223-2009 B-1. The measurement results are shown in Table 2.

TABLE 2

| | Average D90 Pore Diameter (μm) | Air Permeability (cfm) | Moisture Permeability ((g/m$^2$)/24 hr) | Thickness (μm) |
|---|---|---|---|---|
| Comparative Example 2 | ≥15 | — | — | 30-35 |
| Embodiment 14 | 3.4 | 1.6 | 28993 | 28.0 |
| Embodiment 15 | 2.6 | 0.7 | 23282 | 24.7 |

As can be seen from the measurement results in Table 2, the average D90 pore diameter of the meltblown fiber membranes of each embodiment is less than 5 μm, the air permeability is greater than 0.5 cfm, and the moisture permeability is greater than 20000 (g/m)/24 hr. It can be seen from the above that the meltblown fiber membrane prepared by the manufacturing method of the present disclosure can have high air permeability and high moisture permeability. It should be understood that, from other embodiments (not shown in the table), it can be seen that the average D90 pore diameter, air permeability value, moisture permeability value, and thickness of the meltblown fiber membrane of the present disclosure can be between any two values in Table 2, which will not been listed in detail.

According to the aforementioned embodiments of the present disclosure, since the meltblown fibers in the meltblown film used in the present disclosure include the high-fluidity polyester and the modified polyester, and each of the high-fluidity polyester and the modified polyester has a specific range of melt index, the meltblown fiber can have low and concentrated fiber fineness (i.e., low fiber fineness with a high central tendency), thereby being evenly distributed in the meltblown fiber membrane. In addition, since the calendering process of the meltblown film is carried out with pressing rollers with a specific range of roller temperature, the meltblown fiber membrane can have appropriate and concentrated pore sizes (i.e., pore sizes with a high central tendency). Therefore, the meltblown fiber membrane is provided with high moisture permeability and high air permeability. In addition, by adjusting the roller distance and linear pressure (line pressure) of the pressing rollers during the calendering process, the meltblown fiber membrane can also have high pore size uniformity, thereby providing better moisture permeability and air permeability.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure covers modifications and variations of this disclosure provided they fall within the scope of the following claims.

What is claimed is:

1. A manufacturing method of a meltblown fiber membrane, comprising:

passing a meltblown film between a first pressing roller and a second pressing roller to perform a calendering process on the meltblown film, wherein the meltblown film comprises a plurality of meltblown fibers, each of the plurality of meltblown fibers comprises a high-fluidity polyester and a modified polyester, a melt index of the high-fluidity polyester under a temperature of 230° C. ranges from 350 g/10 min to 550 g/10 min, a melt index of the modified polyester under a temperature of 230° C. ranges from 200 g/10 min to 400 g/10 min, and a roller temperature of each of the first pressing roller and the second pressing roller ranges from 100° C. to 155° C.

2. The manufacturing method of the meltblown fiber membrane of claim 1, wherein a roller distance between the first pressing roller and the second pressing roller ranges from 0.05 mm to 0.10 mm.

3. The manufacturing method of the meltblown fiber membrane of claim 1, wherein the high-fluidity polyester is polybutylene terephthalate, and the roller temperature of each of the first pressing roller and the second pressing roller ranges from 130° C. and 155° C.

4. The manufacturing method of the meltblown fiber membrane of claim 1, wherein the high-fluidity polyester is a thermoplastic polyester elastomer, and the roller temperature of each of the first pressing roller and the second pressing roller ranges from 100° C. and 115° C.

5. The manufacturing method of the meltblown fiber membrane of claim 1, wherein a linear pressure of each of the first pressing roller and the second pressing roller ranges from 50 kg/cm to 70 kg/cm.

6. The manufacturing method of the meltblown fiber membrane of claim 1, wherein more than 50% of a quantity of the plurality of meltblown fibers has a fiber diameter ranging from 0.5 μm to 1.5 μm.

7. The manufacturing method of the meltblown fiber membrane of claim 1, wherein more than 75% of a quantity of the plurality of meltblown fibers has a fiber diameter ranging from 0.5 μm to 1.0 μm.

8. The manufacturing method of the meltblown fiber membrane of claim 1, wherein the modified polyester comprises a soft-chain polyester, and the soft-chain polyester has a monomer represented by formula (1):

formula (1)

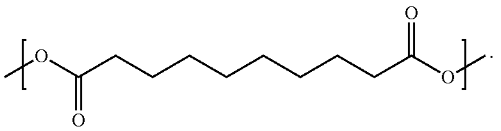

9. The manufacturing method of the meltblown fiber membrane of claim 1, wherein the modified polyester comprises a soft-chain polyester, and the soft-chain polyester has a monomer represented by formula (2):

formula (2)

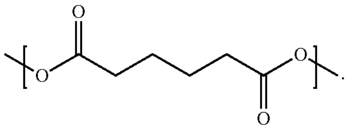

10. The manufacturing method of the meltblown fiber membrane of claim 1, wherein the modified polyester comprises a soft-chain polyester, and the soft-chain polyester has a monomer represented by formula (3):

formula (3)

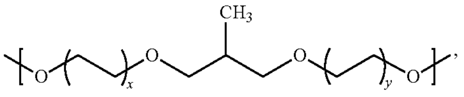

wherein x is a positive integer ranging from 1 to 12, and y is a positive integer ranging from 1 to 12.

* * * * *